(12) United States Patent
Ito (10) Patent No.: US 11,735,836 B2
(45) Date of Patent: Aug. 22, 2023

(54) PRESSURE-WELDING STRUCTURE, TERMINAL-ATTACHED ELECTRIC WIRE, AND MANUFACTURING METHOD FOR TERMINAL-ATTACHED ELECTRIC WIRE

(71) Applicant: Yazaki Corporation, Tokyo (JP)

(72) Inventor: Naoki Ito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 210 days.

(21) Appl. No.: 17/489,699

(22) Filed: Sep. 29, 2021

(65) Prior Publication Data

US 2022/0109252 A1   Apr. 7, 2022

(30) Foreign Application Priority Data

Oct. 7, 2020   (JP) .................................. 2020-169718

(51) Int. Cl.
*H01R 4/2466* (2018.01)
*B23K 20/02* (2006.01)

(52) U.S. Cl.
CPC ........... *H01R 4/2466* (2013.01); *B23K 20/02* (2013.01)

(58) Field of Classification Search
CPC .... H01R 13/10; H01R 4/2425; H01R 4/2466; B23K 2101/32; B23K 2101/38; B23K 20/02
See application file for complete search history.

(56) References Cited

U.S. PATENT DOCUMENTS

| 8,758,054 B2 * | 6/2014 | Miyawaki ............ H01R 9/0518 439/585 |
| 2002/0013091 A1 | 1/2002 | Fujimoto et al. |
| 2014/0345127 A1 * | 11/2014 | Ohsaka ............ H01R 13/65918 29/857 |
| 2019/0199007 A1 * | 6/2019 | Shimada ................ H01R 13/02 |

FOREIGN PATENT DOCUMENTS

| JP | S61-112575 U | 7/1986 |
| JP | 2000-58148 A | 2/2000 |

* cited by examiner

*Primary Examiner* — Jean F Duverne
(74) *Attorney, Agent, or Firm* — Kenealy Vaidya LLP (57) ABSTRACT

A core-wire exposed portion in an electric wire and at least one pair of pressure-welding pieces made of an electroconductive material are included. The core-wire exposed portion is a portion is which a core wire composed of a plurality of element wires is exposed. The pair of pressure-welding pieces are provided with a core wire pressure-welding section in which pressure-welding end surfaces are disposed facing each other at a distance and Kate the core-wire exposed portion press-fitted between the pressure-welding end surfaces. The core wire pressure-welding section is formed as a section that brings all of the element wires in the core-wire exposed portion, between the pressure-welding end surfaces, into contact with either of the pressure-welding end surfaces while being in an aligned state.

7 Claims, 6 Drawing Sheets

PRESSURE-WELDING STRUCTURE, TERMINAL-ATTACHED ELECTRIC WIRE, AND MANUFACTURING METHOD FOR TERMINAL-ATTACHED ELECTRIC WIRE

CROSS-REFERENCE TO RELATED APPLICATION(S)

The present application claims priority to and incorporates by reference the entire contents of Japanese Patent Application No. 2020-169718 filed in Japan on Oct. 7, 2020.

BACKGROUND OF THE INVENTION

1. Field of the Invention

The present invention relates to a pressure-welding structure, a terminal-attached electric wire, and a manufacturing method for the terminal-attached electric wire.

2. Description of the Related Art

Conventionally known connection structures for physically and electrically connecting an electric wire and a terminal fitting to each other in a terminal-attached electric wire include a pressure-welding structure by which a core wire of the electric wire is sandwiched between a pair of pressure-welding pieces of the terminal fitting. For example, Japanese Utility Model Application Laid-open No. S61-112575 and Japanese Patent Application Laid-open No. 2000-058148 disclose pressure-welding structures of this kind.

When such a pressure-welding structure is applied to an electric wire that includes a core wire configured as an assembly of a plurality of element wires, an increased number of element wires in the assembly increases the presence of element wires ("non-contacting element wires") therein that cannot make direct contact with pressure-welding pieces. Those non-contacting element wires are electrically connected to the pressure-welding pieces via the element wires that surround those non-contacting element wires. This means that, with the use of the pressure-welding structure, electrical resistance may increase because current flows between the non-contacting element wires and the pressure-welding pieces via the element wires that surround the non-contacting element wires.

SUMMARY OF THE INVENTION

To solve the above inconvenience, an object of the present invention is to provide a pressure-welding structure, a terminal-attached electric wire, and a terminal-attached electric wire manufacturing method that are enabled to prevent electrical resistance from increasing.

In order to solve the above mentioned problem and achieve the object, a pressure-welding structure according to one aspect of the present invention includes a core-wire exposed portion in an electric wire, the core-wire exposed portion being a portion in which a core wire composed of a plurality of element wires is exposed; and at least one pair of pressure-welding pieces made of an electroconductive material, the at least one pair of pressure-welding pieces each including a core wire pressure-welding section in which pressure-welding end surfaces are disposed facing each other at a distance, the at least one pair of pressure-welding pieces each having the core-wire exposed portion press-fitted between the pressure-welding end surfaces, wherein the core wire pressure-welding section is formed as a section that brings all of the element wires in the core-wire exposed portion, between the pressure-welding end surfaces, into contact with either of the pressure-welding end surfaces while being in an aligned state According to another aspect of the present invention, in the pressure-welding structure, it is preferable that each of the at least one pair of pressure-welding pieces includes an element wire aligning section in which aligning end surfaces are disposed at a distance that is larger than the distance at which the pressure-welding end surfaces are disposed, and the core wire aligning section is formed as a section that enables all of the element wires in the core-wire exposed portion to, between the aligning end surfaces, be moved toward the core wire pressure-welding section while being kept aligned.

According to still another aspect of the present invention, in the pressure-welding structure, it is preferable that the, core wire aligning section is formed as a section that enables all of the element wires in the core-wire exposed portion to, between the pressure-welding end surfaces, be moved toward the core wire pressure-welding section while being kept in the same sequence as in the aligned state in the core wire pressure-welding section.

According co still another aspect of The present invention, in the pressure-welding structure, it is preferable that the pressure-welding end surfaces are formed at a distance that is larger than a diameter that each of the element wires in a circular columnar shape has before being press-fitted and that is smaller than twice the diameter, and the aligning end surfaces are formed at a distance that is larger than twice the diameter and that is smaller than three times the diameter.

In order to achieve the object, a terminal-attached electric wire according to still another aspect of the present invention includes an electric wire including a core wire that is composed of element wires and a covering that covers the core wire except for a core-wire exposed. portion in which the core wire is exposed; and a terminal fitting including at least one pair of pressure-welding pieces, the at least one pair of pressure-welding pieces each including a core wire pressure-welding section in which pressure-welding end surfaces are disposed facing each other at a distance, the terminal fitting having the core-wire exposed portion press-fitted between the pressure-welding end surfaces in each of the at least one pair of pressure-welding pieces, wherein the core wire pressure-welding section is formed as a section that brings all of the element, wires in the core-wire exposed portion, between the pressure-welding end surfaces, into contact with either of the pressure-welding end surfaces while being in an aligned state.

In order to achieve the object, a terminal-attached electric wire manufacturing method according to still another aspect of the present invention includes attaching a core-wire exposed portion in an electric wire to a terminal fitting, the core-wire exposed portion being a portion in which a core wire composed of a plurality of element wires is exposed, the terminal fitting including at least one pair of pressure-welding pieces, the at least one pair of pressure-welding pieces each including a core wire pressure-welding section in which pressure-welding end surfaces are disposed facing each other at a distance, the at least one pair of pressure-welding pieces each including a core wire aligning section in which aligning end surfaces are disposed facing each other at a distance that is larger than the distance at which the pressure-welding end surfaces are disposed, wherein the attaching a core-wire exposed portion comprises: inserting, while aligning all of the element wires in the core-wire exposed portion between the aligning end surfaces, and then, between the aligning end surfaces, moving all of the element wires in the core-wire exposed portion toward the core wire pressure-welding section while being kept in an aligned state entered by the element wires at the insertion, and press-fitting, between the pressure-welding end surfaces, the core-wire exposed portion that has passed through the core wire aligning section, and bringing all of the element wires in the core wire exposed portion, between the pressure-welding end surfaces, into contact with either of the pressure-welding end surfaces while being in an aligned state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Based on the drawings, the following describes in detail an embodiment of a pressure-welding structure, a terminal-attached electric wire and a terminal-attached electric wire manufacturing method according to the present invention. This embodiment is not intended to limit this invention.

Embodiment

An embodiment of a pressure-welding structure, a terminal-attached electric wire, and a terminal-attached electric wire manufacturing method according to the present invention, among various such embodiments, is described based on. FIG. 1 to FIG. 6.

Figure 1:
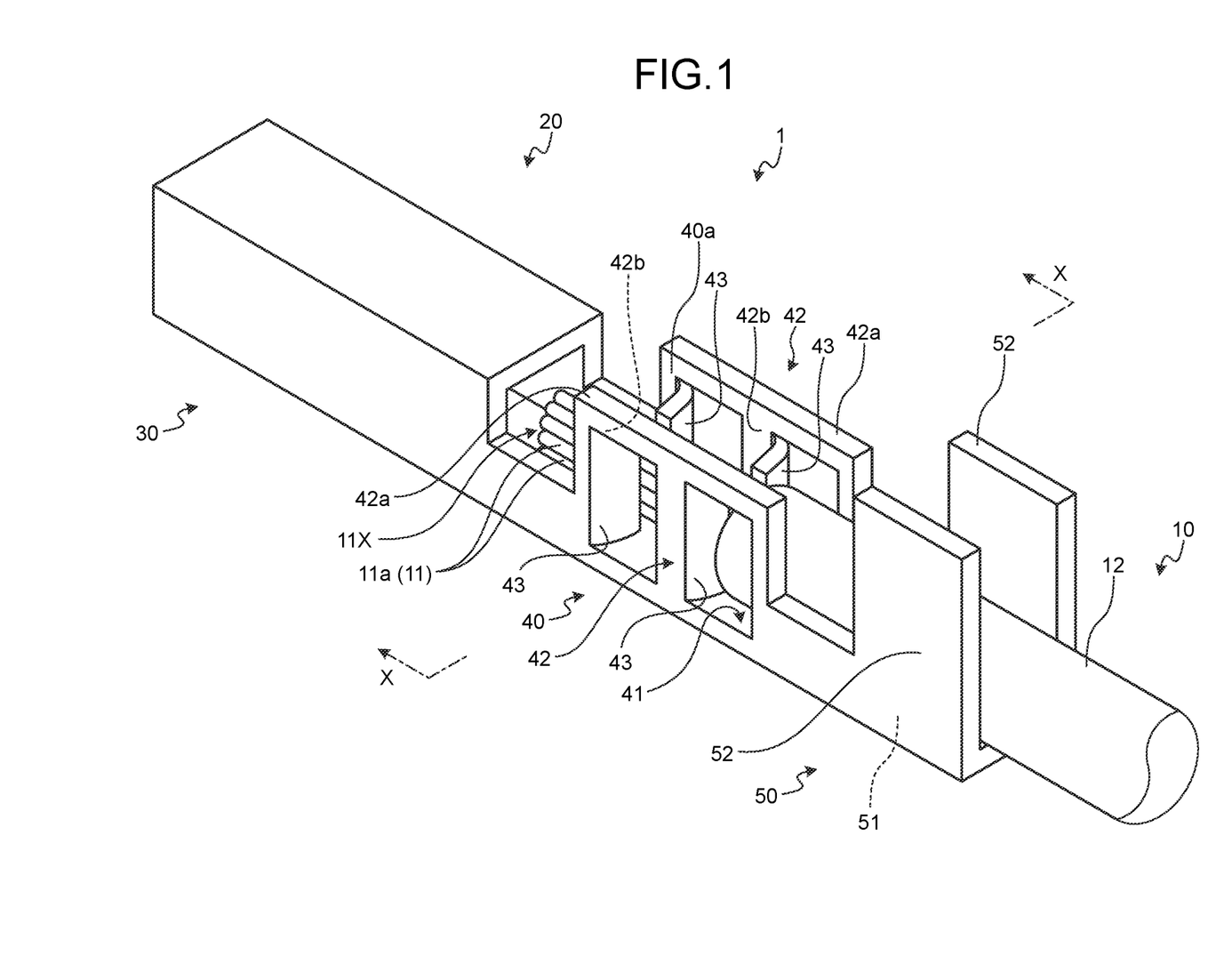
FIG. 1 is a perspective view illustrating a terminal-attached electric wire in an embodiment.

Reference sign 1 in FIG. 1 indicates a terminal-attached electric wire in the present embodiment. This terminal-attached electric wire 1 is produced by use of a manufacturing method described below.

The terminal-attached electric wire 1 includes an electric wire 10 and a terminal fitting 20 that are physically and electrically connected to each other (FIG. 1 to FIG. 4). As described below, the electric wire 10 has a core-wire exposed portion 11X, a portion in which a core wire 11 that is composed of a plurality of element wires 11a is exposed. Also as described below, the terminal fitting 20 is provided with a core wire pressure-welding section 43A in which pressure-welding end surfaces 43a, 43a are disposed facing each other at a distance and an element wire aligning'section 43B in which aligning end surfaces 43b, 43b are disposed facing each other at a distance larger than the distance between the pressure-welding end surfaces 43a, 43a, and includes at least one pair of pressure-welding pieces 43, 43 in which the core-wire exposed portion 11X is press-fitted between the respective pressure-welding end surfaces 43a, 43a. The terminal-attached electric wire 1 is provided with a pressure-welding structure formed by a corresponding one of the core-wire exposed portions 11X in the electric wire 10 and at least one pair of pressure-welding pieces 43, 43 having the corresponding core-wire exposed portion 11X press-fitted. This terminal-attached electric wire 1 enables the electric wire 10 and the terminal fitting 20 to be physically and electrically connected to each other by means of the pressure-welding structure. In this terminal-attached electric wire 1, the single terminal fitting 20 is attached to the single core-wire exposed portion 11X in the electric wire 10.

When the terminal-attached electric wire 1 includes only the single electric wire 10, the terminal fitting 20 is attached to the core-wire exposed portion 11X in this single electric wire 10. For example, with the terminal-attached electric wire 1 in this case, when the core-wire exposed portion 11X is provided in only one location of the single electric wire 10, the terminal fitting 20 is attached to the core-wire exposed portion 11X in that location. When the core-wire exposed portions 11X are provided in a plurality of locations in the single electric wire 10, the terminal fitting 20 is attached to at least one of the core-wire exposed portions 11X in those locations. Each of the terminal-attached electric wires 1 of these kinds is provided with pressure-welding structures the number of which equals to the number of core-wire exposed portions 11X to which the terminal fitting 20 is attached. In a specific example described below, the terminal fitting 20 applicable to each of the terminal-attached electric wires 1 of these kinds is given as an example.

On the other hand, when the terminal-attached electric wire 1 includes a plurality of the electric wires 10, the electric wires 10 are connected to one another via the one or more terminal fittings 20. For example, in the terminal-attached electric wire 1 in this case, the respective core-wire exposed portions 11X which correspond one-to-one to the electric wires 10 are each press-fitted into a corresponding pair of the at least one pair of pressure-welding pieces 43, 43 corresponding to core-wire exposed portions 11X of the single terminal fitting 20, whereby these electric wires 10 are electrically connected to one another via the terminal fitting 20 that serves as a joining terminal. In this terminal-attached electric wire 1, the pressure-welding structures are provided, each corresponding to one of the electric wires 10. Alternatively, for example, in the terminal-attached electric wire 1 in this case, the terminal fittings 20 is interposed one by one serving as a Mining terminal between electric wires 10, and, with respect to each of the terminal fittings 20, each of the core-wire exposed portions 11X provided in one location in corresponding ones of the at least two electric wires 10 is press-fitted into a corresponding pair of the at least one pair of pressure-welding pieces 43, 43 corresponding to core-wire exposed portions 11X of the single terminal fitting 20, whereby all of the electric wires 10 are electrically connected to one another. In the terminal-attached electric wire 1 in this case, the pressure-welding structures are provided one-to-one to the core-wire exposed portions 11X to which the terminal fittings 20 are attached.

Figure 5:
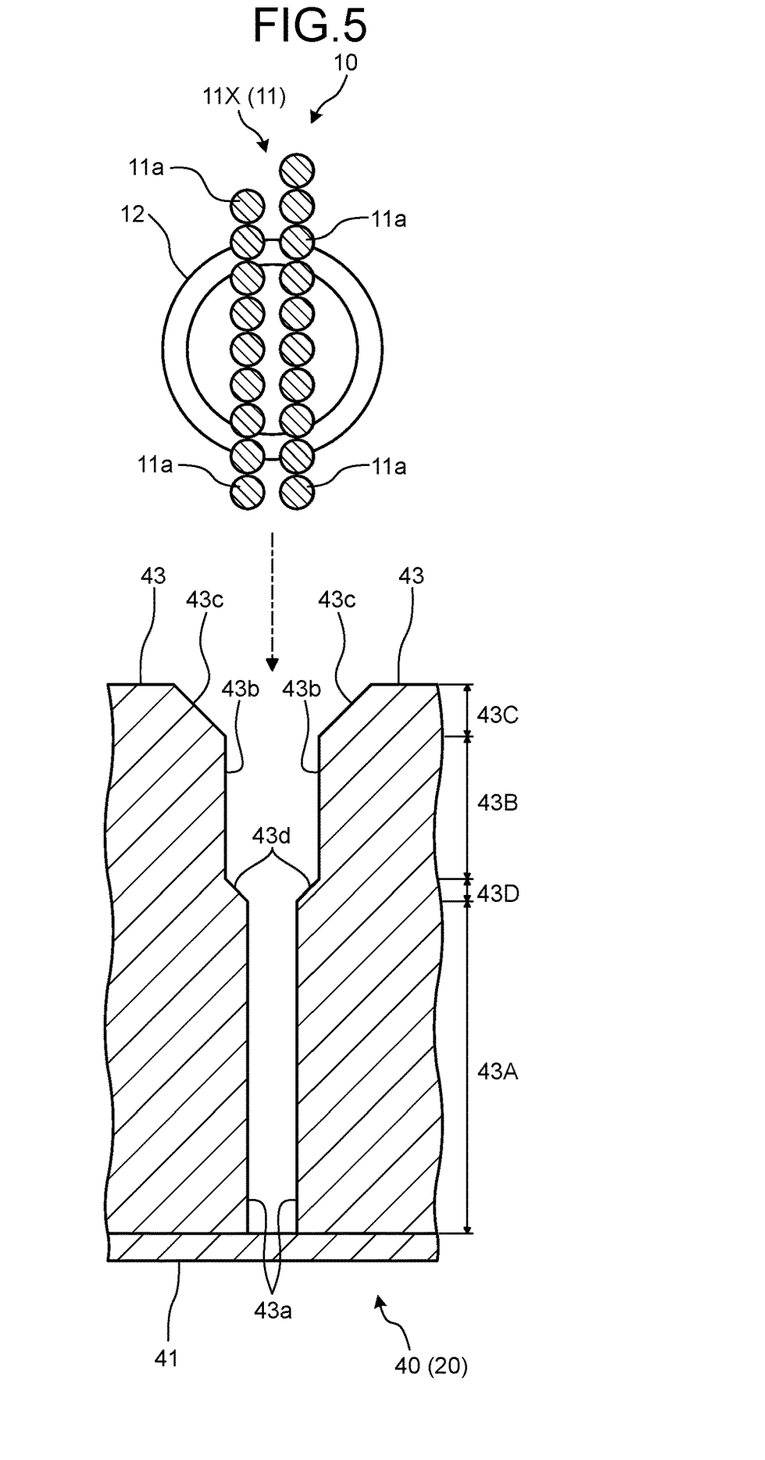
FIG. 5 is a view corresponding to the section taken along the X-X line of FIG. 1, in which an electric wire already subjected to an element wire preliminarily aligning step in a modified embodiment is illustrated with a terminal fitting yet to be attached thereto.
Figure 6:
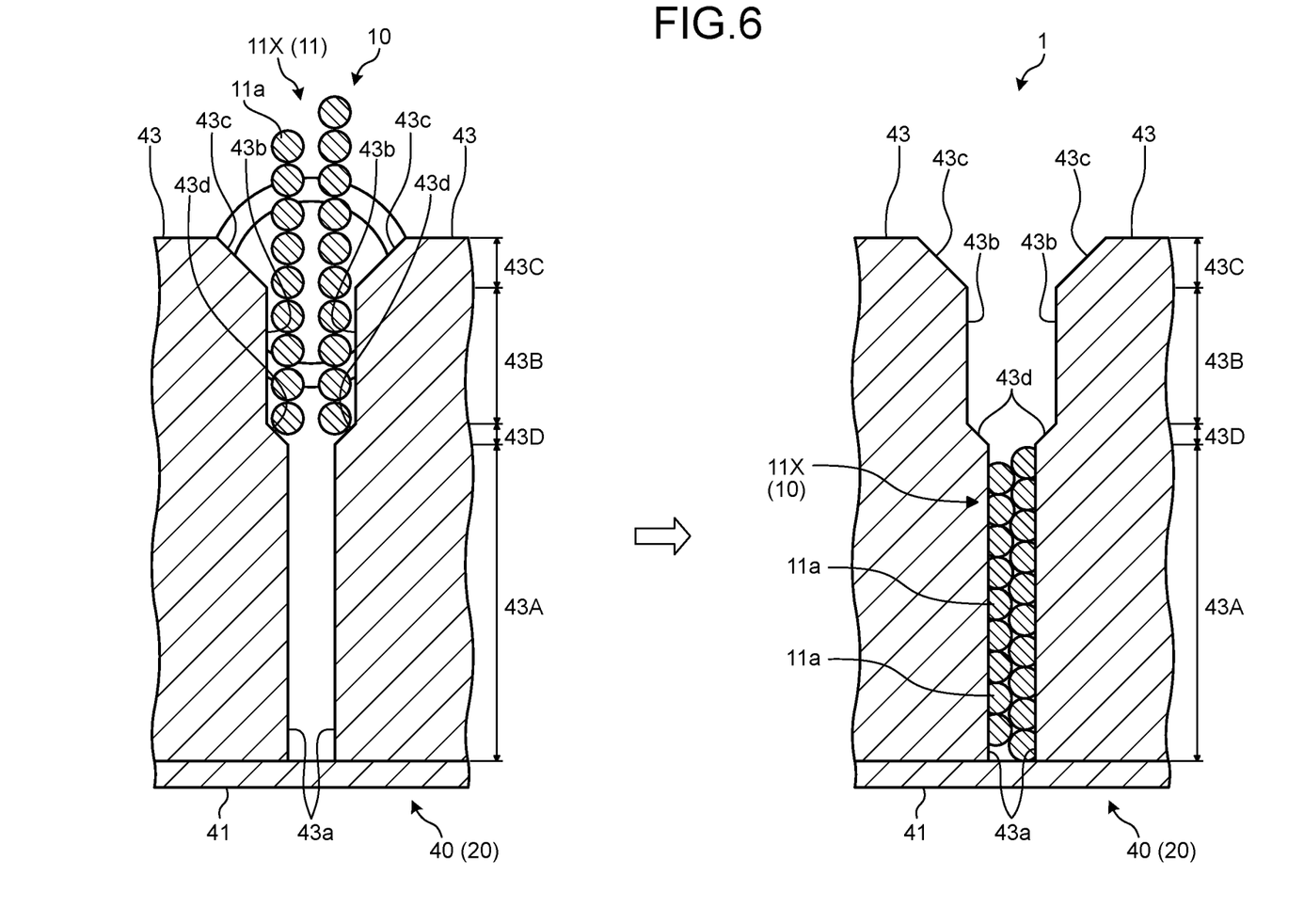
FIG. 6 is a view corresponding to the section taken along the X-X line of FIG. 1, in which an electric wire attaching step in the modified embodiment is illustrated with the pressure-welding structure in the embodiment.

Each of the electric wires 10 includes the core wire 11 that is composed of the element wires 11a and a covering 12 that covers the core wire 11 except for the core-wire exposed portion 11 therein in which the core wire 11 is exposed (FIG. 1, FIG. 5 and. FIG. 6). This electric wire 10 has, in a terminal part thereof or a part between both ends thereof, the core-wire exposed portion 11X that is exposed as a result of having the covering 12 removed therefrom. The electric wires 10 described herein each include: the core wire 11 obtained by bundling, in a circular columnar shape, a plurality of the element wires 11a each made of a wire member of electroconductive metal; and the covering 12 concentrically covering this core wire 11 from the outer surface thereof and having a circular cylindrical shape. The electric wire 10 described herein has the core wire exposed portion 11X in a terminal portion thereof.

The terminal fitting 20 is made of an electroconductive material such as metal. The terminal fitting 20 described herein is shaped by press-molding a base material for which a metal plate is used. The terminal fitting 20 described herein includes: a terminal connector 30 configured to be physically and electrically connected to a terminal connector (not illustrated) of a counterpart terminal fitting; a core-wire connector 40 configured to be physically and electrically connected to the core-wire exposed portion 11X in the terminal portion of the electric wire 10; and a covering connector 50 configured to physically connected to the covering 12 in the terminal portion of the electric wire 10 (FIG. 1 and FIG. 2).

For example, one of the terminal connector 30 of the terminal fitting 20 and the terminal connector of the counterpart terminal fitting is formed in a female terminal shape, and the other is formed in a male terminal shape, and are inserted and fitted into each other. In this example, while the terminal connector 30 of the terminal fitting 20 is formed in a female terminal shape, the terminal connector of the counterpart terminal fitting is formed in a male terminal shape.

Figure 2:
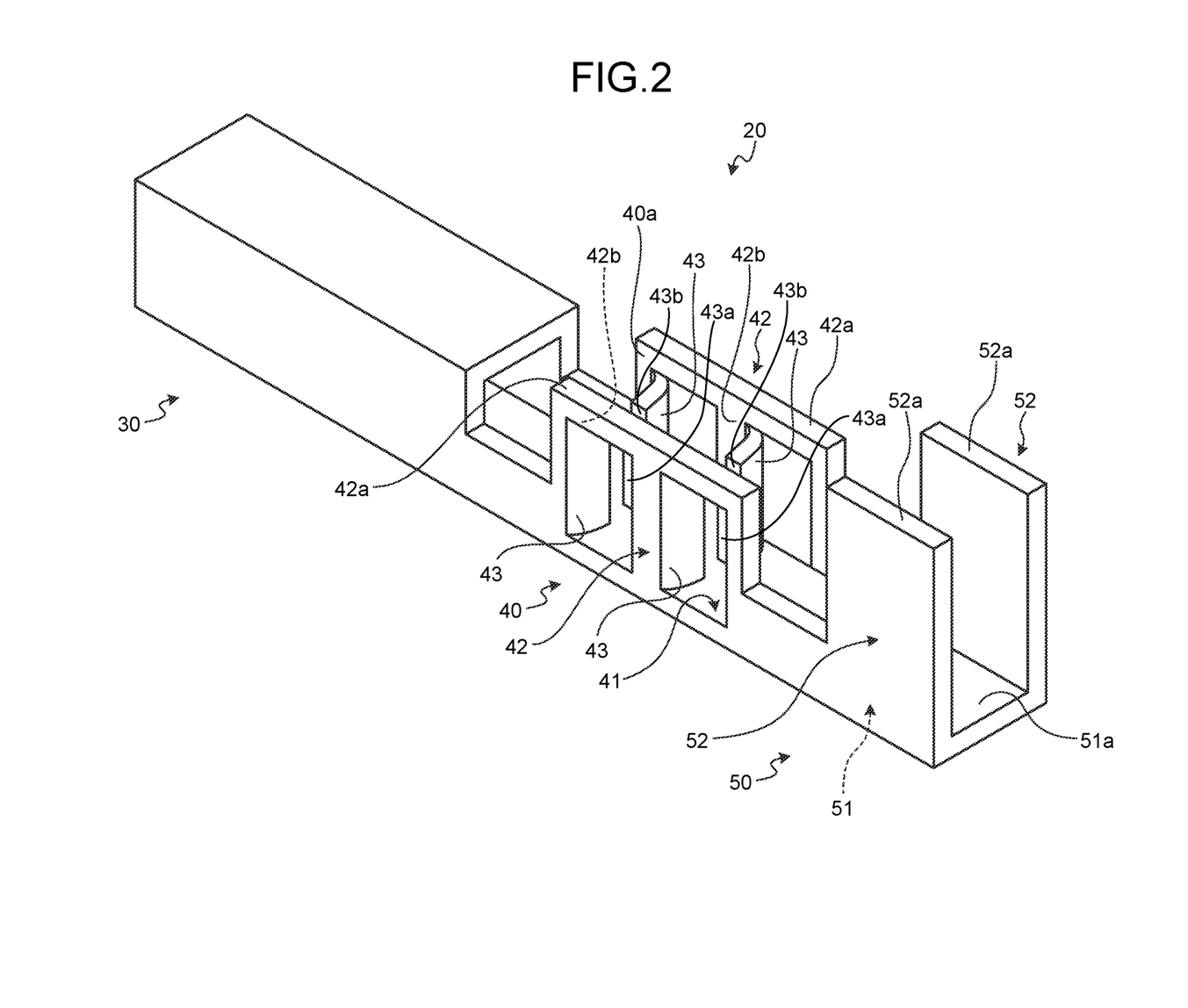
FIG. 2 is a perspective view illustrating a terminal fitting in the embodiment.

The main portion of the core-wire connector 40 is composed of a bottom portion 41 and a pair of piece portions 42, 42 projected in the same direction from both ends of this bottom portion 41 (FIG. 1 and FIG. 2). The core-wire exposed portion 11X is housed in a space surrounded by the bottom portion 41 and the pair of piece portions 42, 42. In the core-wire connector 40 described herein, the pair of piece portions 42, 42 are vertically provided from both ends of the bottom portion 41.

In this core-wire connector 40, the core-wire exposed portion 11X is inserted, for example, between inner wall surfaces 42b, 42b through an opening 40a formed between respective free ends 42a, 42a of the piece portions 42, 42 (FIG. 1 and FIG. 2). The core-wire exposed portion 11X is physically and electrically connected to the core-wire connector 40 at least in respective inner wall surfaces 42b, 42b of the piece portions 42, 42. For this reason, this core-wire connector 40 further has the at least one pair of pressure-welding pieces 43, 43 that cause the core-wire exposed portion 11u housed in the inner side of the space to be physically and electrically connected to the core-wire connector 40 between the inner wall surfaces 42b, 42b of the piece portions 42, 42 (FIG. 1 and FIG. 2). The core-wire connector 40 described herein has two pairs of the pressure-welding pieces 43, 43. Each of the pressure-welding pieces 43 described herein is formed as a piece body that has the same thickness as the plate thickness of a metal plate used as a base material thereof.

While each pair of the pressure-welding pieces 43, 43 are projected from the respective inner wall surfaces 42b, 42b of the corresponding piece portions 42, 42, respective end surfaces of the pressure-welding pieces 43, 43 are arranged facing each other at a distance in a direct on in which the piece portions 42, 42 face each other. The core-wire exposed portion 11X is inserted into a space between the respective end surfaces of this pair of pressure-welding pieces 43, 43 in a direction from the opening 40a toward the bottom portion 41.

Figure 3:
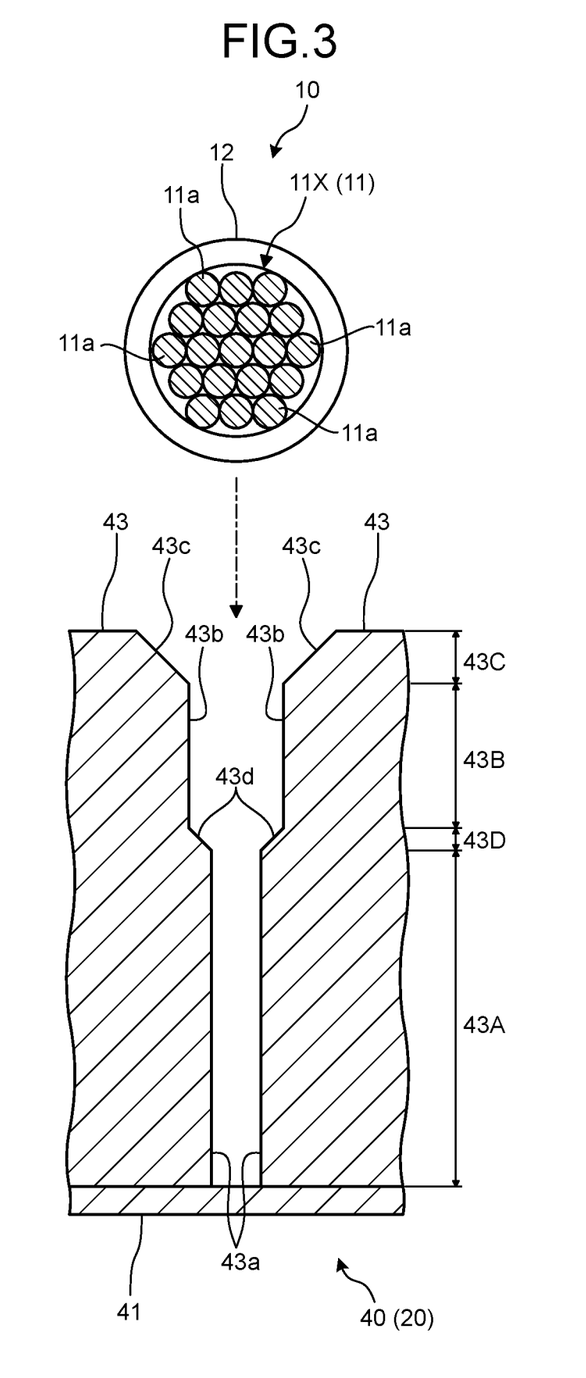
FIG. 3 is a view corresponding to a section taken along the X-X line of FIG. 1, in which an electric wire and the terminal fitting in the embodiment that are yet to be attached to each other are illustrated.
Figure 4:
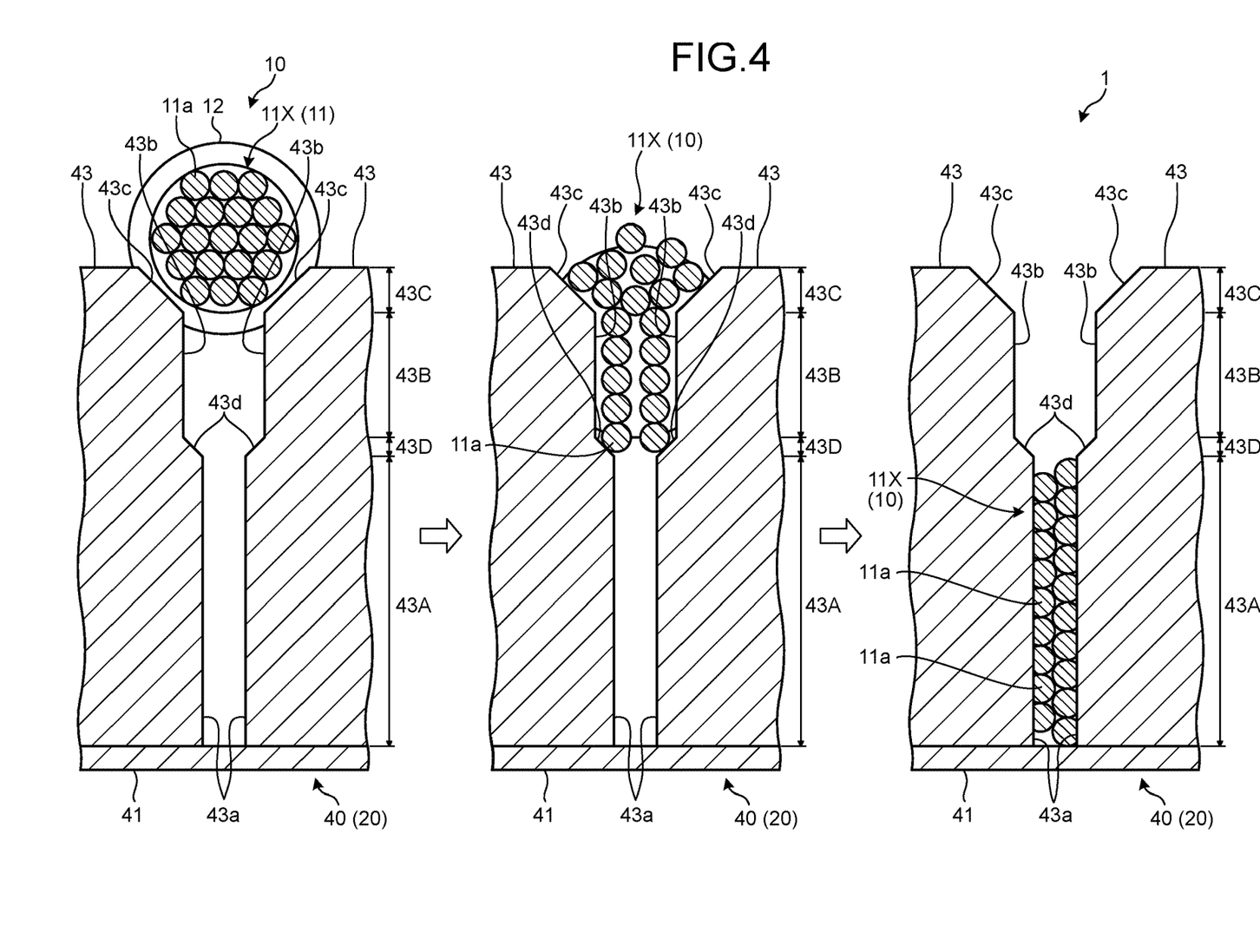
FIG. 4 illustrates views each corresponding to the section taken along the X-X line of FIG. 1, in which an electric wire attaching step is illustrated with a pressure-welding structure in the embodiment.

Specifically, the pair of pressure-welding pieces 43, 43 include: the core wire pressure-welding section 43A in which the pressure-welding end surfaces 43a, 43a, parts of end surfaces thereof, are disposed facing each other at a distance; and the element wire aligning section 43B in which the aligning end surfaces 43b, 43b, other parts of the end surfaces thereof, are disposed facing each other at a distance (FIG. 3 and FIG. 4).

The pressure-welding end surfaces 43a, 43a and the aligning end surfaces 43b, 43b each are a plane extending in an insertion direction of the core-wire exposed portion 11X from the opening 40a. Thus, the pressure-welding end. surfaces 43a, 43a and the aligning end surfaces 43b, 43b each are a plane the length of which extends in the insertion direction and the width of which corresponds to the thickness of each of the pair of pressure-welding pieces 43, 43. Those aligning end surfaces 43b, 43b are formed so that the distance therebetween can be larger than the distance between those pressure-welding end surfaces 43a, 43a.

In the pair of pressure-welding pieces 43, 43, the core wire pressure-welding section 43A is a section into which one of the core-wire exposed portions 11X is press-fitted therein. Thus, that core-wire exposed portion 11X is physically and electrically connected to the pair of pressure-welding pieces 43, 43 as a result of being press-fitted between the pressure-welding end surfaces 43a, 43a. Furthermore, the pair of pressure-welding pieces 43, 43 have the core-wire exposed portion 11X press-fitted into the core wire pressure-welding section 43A via the element wire aligning section 43B.

The core wire pressure-welding section 43A is formed as a section that brings all of the element wires 11a in the core-wire exposed portion 11X, between the pressure-welding end surfaces 43a, 43a, into contact with either of the pressure-welding end surfaces 43a, 43a in an aligned state. This core wire pressure-welding section 43A brings all of the element wires 11a in the core-wire exposed portion 11X into contact with either of the pressure-welding end surfaces 43a, 43a while being kept aligned in one or two lines. For example, when the core wire pressure-welding section 43A has those pressure-welding end surfaces 43a, 43a disposed at a distance set so that all of the element wires 11a in the core-wire exposed portion 11X can be kept aligned in one line when being press-fitted, all of those element wires 11a are each brought into contact with both of the pressure-welding end surfaces 43a, 43a while each being sandwiched between the pressure-welding end surfaces 43a, 43a. Alternatively, when the core wire pressure-welding section 43A has those pressure-welding end surfaces 43a, 43a disposed at a distance set so that all of the element wires 11a in the core-wire exposed portion 11X can be kept aligned in two lines when being press-fitted, all of those element wires 11a are sandwiched between those pressure-welding end surfaces 43a, 43a while the element wires 11a in one line are kept in contact with one of the pressure-welding end surfaces 43a, 43a at the same time as the element wires 11a in the other line are kept in contact with the other pressure-welding end surface 43a.

The core wire aligning section 43B is formed as a section that enables all of the element wires 11a in the core-wire exposed portion 11X to, between the aligning end surfaces 43b, 43b, be moved toward the core wire pressure-welding section 43A while being kept aligned. The element wire aligning section 43B in the present embodiment is formed as a section that enables all of the element wires 11a in the core-wire exposed portion 11X to be inserted between the aligning end surfaces 43b, 43b while being aligned and that enables all of the element wires 11a in the core-wire exposed portion 11X to, between the aligning end surface 43b, 43b, be moved toward the core wire pressure-welding section 43A while being kept in an aligned state thereof entered at the insertion.

Furthermore, this core wire aligning section 43B is formed as a section that enables all of the element wires 11a in the core-wire exposed portion 11 to, between the aligning end surfaces 43b, 43b, be moved toward the core wire pressure-welding section 43A while being kept in the same sequence as in the aligned state in the core wire pressure-welding section 43A. In this case, in the core wire pressure-welding section 43A, all of the element wires 11a in the core-wire exposed portion 11X are inserted between the pressure-welding end surfaces -13a, 43a while being kept in the aligned state thereof entered in the element wire aligning section 43B. The element wire aligning section 43B described herein is formed as a section that enables all of the element wires 11a in the core-wire exposed portion 11X to be inserted between the aligning end surfaces 43b, 43b while being aligned in the same sequence as in the aligned state in the core wire pressure-welding section 43A and that enables all of the element wires 11a in the core-wire exposed portion 11X to, between the aligning end surface 43b, 43b, be moved toward the core wire pressure-welding section 43A while being kept in an aligned state thereof entered at the insertion.

In the example illustrated in the drawings, all of the element wires 11a in the core-wire exposed portion 11X are aligned into two lines in the element wire aligning section 43B and then, while being kept aligned in two lines, are press-fitted into the core wire pressure-welding section 43A. Thus, the pressure-welding end surfaces 43a, 43a in this example are formed at a distance that is larger than the diameter that the element wire 11a in a circular columnar shape has before being press-fitted and that is smaller than twice that diameter. The aligning end surfaces 43b, 43b in this example are formed at a distance that is larger than twice the diameter of the element wire 11a and that is smaller than three times the diameter.

Alternatively, the pair of pressure-welding pieces 43, 43 may cause all of the element wires 11a in the core-wire exposed portion 11X to be aligned into one line in the element wire aligning section 43B and be then press-fitted into the core wire pressure-welding section 43A while being kept thus aligned in one line. The pressure-welding end surfaces 43a, 43a in this case are formed with the distance therebetween being smaller than the diameter of the element wire 11a. The aligning end surfaces 43b, 43b in this case are formed at a distance that is larger than the diameter of the element wire 11a and that is smaller than twice the diameter.

The pair of pressure-welding pieces 43, 43 further include a core wire introducing section (hereinafter the "first core wire introducing section") 43C that constitutes an insertion starting point when the core-wire exposed portion 11X is inserted between the aligning end surfaces 43b, 43b and that has an opening wider than the distance between the aligning end surfaces 43b, 43b (FIG. 3 and FIG. 4). The par of pressure-welding pieces 43, 43 still further include another core wire introducing section (hereinafter the "second core wire introducing section") 43D that constitutes an insertion starting point when the core-wire exposed portion 11X between the aligning end surfaces 43b, 43b is press-fitted. between the pressure-welding end surfaces 43a, 43a and that has an opening wider than the distance between the pressure-welding end surfaces 43a, 43a (FIG. 3 and FIG. 4).

The first core wire introducing section 43C is provided to respective end portions of the pair of pressure-welding pieces 43, 43 on one side thereof that has the opening 40a. For example, the pair of pressure-welding pieces 43, 43 have, on one side that faces the opening 40a, corresponding sloping portions 43c, 43c that continue into the aligning end surfaces 43b, 43b and that are more distant from each other toward the opening 40a from the boundary with the aligning end surfaces 43b, 43b (FIG. 3 and FIG. 4). The first core wire introducing section 43C are formed of those sloping portions 43c, 43c. Those sloping portions 43c, 43c may be formed as planes as in the cases of the pressure-welding end surfaces 43a, 43a and the aligning end surfaces 43b, 43b or may be formed as blade-shaped pressing blades. Each of those sloping portions 43c, 43c described herein is a plane as in the cases of each of the pressure-welding end surfaces 43a, 43a and each of the aligning end surfaces 43b, 43b and is formed as a sloping plane that has a width equal to the thickness of each of the pair of pressure-welding pieces 43, 43. Note that FIG. 1 and FIG. 2 omit illustrations of the sloping portions 43c, 43c.

The second core wire introducing section 43D is provided between the core wire pressure-welding section 43A and the element wire aligning section 43B in the pair of pressure-welding pieces 43, 43. For example, between the core wire pressure-welding section 43A and element wire aligning section 43B, the pair of pressure-welding pieces 43, 43 have corresponding sloping portions 43d, 43d that continue into the pressure-welding end surfaces 43a, 43a on one side that faces the bottom portion 41 and continue into the aligning end surfaces 43b, 43b on another side that faces the opening 40a and that are more distant from each other toward the boundary with the aligning end surfaces 43b, 43b from the boundary with the aligning end surfaces 43a, 43a (FIG. 3 and FIG. 4). The second core wire introducing section 43D is formed of those individual sloping portions 43d, 43d. Each of those sloping portions 43d, 43d is a plane as in the cases of each of the pressure-welding end surfaces 43a, 43a and each of the aligning end surfaces 43b, 43b and is formed as a sloping plane that has a width equal to the thickness of each of the pair of pressure-welding pieces 43, 43.

The covering connector 50 is composed of a barrel bottom portion 51 and a pair of barrel piece portions 52, 52 projected from both ends of this barrel bottom portion 51 (FIG. 1 and FIG. 2). In this covering connector 50, a portion with the covering 12 in the terminal of the electric wire 10 is inserted inward through an opening between respective free ends 52a, 52a of the barrel piece portions 52, 52, and the portion with the covering 12 is mounted on an inner wall surface (bottom surface) 51a of the barrel bottom portion. 51, for example. In this covering connector 50, the barrel piece portions 52, 52 are wrapped around the covering 12 in the terminal of the electric wire 10 while being deformed with the application of pressure, for example.

For this terminal-attached electric wire 1, the core-wire exposed portion 11X is formed by removing a part of the covering 12 from the electric wire 10. For this terminal-attached electric wire 1, the electric wire 10 is then attached to the terminal fitting 20 by having the core-wire exposed portion 11X press-fitted into the pair of pressure-welding pieces 43, 43 of the terminal fitting 20. Thus, the manufacturing method for the terminal-attached electric wire 1 includes: a core-wire exposed portion forming step in which the core-wire exposed portion 11X is formed in the electric wire 10; and an electric wire attaching step in which the core-wire exposed portion 11X in the electric wire 10 is attached to the terminal fitting 20.

In the core-wire exposed portion forming step, the covering 12 in a certain position of the electric wire 10 is removed, whereby the core-wire exposed portion 11X is formed in the certain position of the electric wire 10.

The electric wire attaching step includes: an element wire aligning step in which all of the element wires 11a in the core-wire exposed portion 11X are inserted. between the aligning end surfaces 43b, 43b while being aligned, and are moved, between the aligning end surfaces 43b, 43b, toward the core wire pressure-welding section 43A while being in an aligned state thereof entered at the insertion; a core wire pare-we step in which the core-wire exposed portion 11X that has passed through the element wire aligning section 43B is press-fitted between the pressure-welding end surfaces 43a, 43a, whereby, between the pressure-welding end surfaces 43a, 43a, all of element wires 11a in the core wire exposed portion 11X are each brought into contact with either of the pressure-welding end surfaces 43a, 43a while being kept in the aligned state.

In the element wire aligning step, the core-wire exposed portion 11X is inserted between the sloping portions 43c, 43c of the first core wire introducing section 43C, and, while the element wires 11a on the outer surface side of the core-wire exposed portion 11X are moved along either of the sloping portions 43c, 43c, the element wires 11a on the internal side of the core-wire exposed portion 11X are pushed up toward the opening 40a by the element wires 11a on the outer surface side (the view on the left side of FIG. 4). Thereafter, in this element wire aligning step, the element wires 11a on the outer surface side that have moved down along the sloping portions 43c, 43c are inserted between the aligning end surfaces 43b, 43b while being aligned, and the element wires 11a on the internal side that have been pushed up by the element wires 11a on the outer surface side are inserted between the aligning end surface 43b, 43b while being aligned. (the view in the center of FIG. 4). In this element wire aligning step, all of the element wires 11a in the core-wire exposed portion 11X are thus inserted between those aligning eon surfaces 43b, 43b while being aligned. Thus, in the pair of pressure-welding pieces 43, 43 in the present embodiment, not only the element wire aligning section 43B but also the first core wire introducing section 43C can be considered to function to align the element wires 11a in the core-wire exposed portion 11X.

In the core wire pressure-welding step, all of the element wires 11a in the core-wire exposed portion 11X that have been aligned in the core wire aligning step are sequentially press-fitted between the pressure-welding end surfaces 43a, 43a via the sloping portions 43d, 43d of the second core wire introducing section 43D, whereby all of those element wires 11a are brought into contact with the pressure-welding end surfaces 43a, 43a in the aligned state (the view on the right side of FIG. 4). In this core wire pressure-welding step, all of the element wires 11a in the core-wire exposed portion 11X are press-fitted between the pressure-welding end surfaces 43a, 43a visa the second core wire introducing section 43D while being kept aligned in a sequences in which those element wires 11a have been aligned in the element wire aligning section 43B. In this core wire pressure-welding step, the core-wire exposed portion 11X is inserted between the sloping portions 43d, 43d of the second core wire introducing section 43D, and, while all of the element wires 11a in the core-wire exposed portion 11X each are moved along either of the sloping portions 43d, 43d, all of those element wires 11a are press-fitted between the pressure-welding end surfaces 43a, 43a while all of the element wires 11a are kept aligned in a sequence in which they have been aligned in the element wire aligning section 43B.

In the element wire aligning step described herein, the element wires 11a on the outer surface side, which have each come moving down along either of the sloping portions 43c, 43c of the first core wire introducing section 43C, and the element wires 11a on the internal side, which have been pushed up by those element wires 11a on the outer surface side, are inserted between the aligning end surfaces 43b, 43b while being aligned in the same sequence as in the aligned state in the core wire pressure-welding section 43A. Thus, in the element wire aligning step described herein, all of the element wires 11a in the core-wire exposed portion 11X are moved between the aligning end surfaces 43b, 43b toward the core wire pressure-welding section 43A while being kept in the same sequence as in the aligned state in the core wire pressure-welding section 43A.

Subsequently, in the core wire pressure-welding step described herein, while each being moved along either of the sloping portions 43d, 43d of the second core wire introducing section 43D, all of those element wires 11a in the core-wire exposed portion 11X are press-fitted between the pressure-welding end surfaces 43a, 43a while the element wires 11a is kept in a sequence in the core wire aligning section 43B. As a result, in the core wire pressure-welding step, all of the element wires 11a in the core-wire exposed portion 11X are press-fitted between the pressure-welding end surfaces 43a, 43a while being kept in a desired aligned state.

For example, in the element wire aligning step according to the illustrated example, while being aligned along either of the sloping portions 43c, 43c of the first core wire introducing section 43C, the element wires 11a in the core-wire exposed portion 11X are inserted in such a manner as to be aligned between the aligning end surfaces 43b, 43b into two lines. Subsequently, in the core wire aligning step in this example, all of the element wires 11a in the core-wire exposed portion 11X that have been inserted between the aligning end surfaces 43b, 43b are moved toward the core wire pressure-welding section 43A. while being kept thus aligned in two lines. In this core wire pressuring step in this example, one line of the element wires 11a and the other line of the element wires 11a are brought closer to each other by having the element wires 11a in one line moved along one of the sloping portions 43d and having the element wires 11a in the other line moved along the other sloping portion 43d at the same time, whereby all of those element wires 11a are press-fitted between the pressure-welding end surfaces 43a, 43a while being kept aligned in two lines.

Note that, in the core wire pressure-welding step in a case where all of the element wires 11a in the core-wire exposed portion 11X have been aligned in one line in the core wire aligning section 43B, all of those element wires 11a are moved along at least one of the sloping portions 43d, 43dto be press-fitted. between the pressure-welding end surfaces 43a, 43a while all of those element wires 11a are kept aligned in one line.

Alternatively, the core wire aligning section 43B may be a section that enables all of the element wires 11a in the core-wire exposed portion 11X between the aligning end surfaces 43b, 43b to be moved toward the core wire pressure-welding section 43A while being kept aligned in lines the number of which is larger than the number in the aligned state in the core wire pressure-welding section 43A. In this case, the core wire pressure-welding section 43A causes all of the element wires 11a in the core-wire exposed portion 11 to be press-fitted between the pressure-welding end surfaces 43a, 43a while being aligned in such a manner that the number of lines thereof is decreased so as to be in a desired aligned state in the core wire pressure-welding section 43A. That is, the pair of pressure-welding pieces 43, 43 may cause all of the element wires 11a in the core-wire exposed portion 11X to be aligned into three lines in the element wire aligning section 43B and be press-fitted into the core wire pressure-welding section 43A while being aligned into two lines, for example.

As described above, in the pressure-welding structure in the present embodiment, the pair of pressure-welding piece 43, 43 into which the core-wire exposed portion 11X is press-fitted are provided with the or wire pressure-welding section 43A that brings all of the element wires 11a in the core-wire exposed portion 11X between the pressure-welding end surfaces 43a, 43a into contact with either of the pressure-welding end surfaces 43a, 43a in the aligned state. Therefore, this pressure-welding structure can reduce electrical resistance as compared with a case where some of the element wires 11a are not brought into contact with the pressure-welding end surface 43a.

Furthermore, in the pressure-welding structure in the present embodiment, the pair of pressure-welding pieces 43, 43 are provided with a section that enables all of the element wires 11a in the core-wire exposed portion 11X between the aligning end surfaces 43b, 43b to be moved toward the core wire pressure-wielding section 43A while being kept aligned, the section being the element wire aligning section 43B in which the aligning end surfaces 43b, 43b are disposed facing each other ate, a distance that is larger than the distance between the pressure-welding end surfaces 43a, 43a. Therefore, in this pressure-welding structure, when the core-wire exposed portion 11X is press-fitted between the pressure-welding end surfaces 43a, 43a, all of those element wires 11a can be each brought into contact with either of the pressure-welding end surfaces 43a, 43a in the aligned state. This is made possible in such a manner that: all of the element wires 11a in the core-wire exposed portion 11X are aligned in a gap in the element wire aligning section 43B that is wider than a gap in the core wire pressure-welding section 43A; and all of the element wires 11a thus aligned are then press-fitted in the core wire pressure-welding section 43A. That is, this pressure-welding structure allows adoption of a manufacturing method in which: all of the element wires 11a in the core-wire exposed portion 11X are aligned once; and all of those element wires 11a are press-fitted from the element wire aligning section 43P into the core wire pressure-welding section 43A while being aligned. This makes it possible to press-fit all of those element wires 11a between the pressure-welding end surfaces 43a, 43a while preventing excess loads from being applied to the element wires 11a. Consequently, the pressure-welding structure and the manufacturing method for the terminal-attached electric wire 1 in the present embodiment can reduce electrical resistance while keeping the quality of the element wires 11a while enabling enhancement in workability in assembly.

In addition, the terminal-attached electric wire 1 in the present embodiment includes the above pressure-welding structure and can therefore produce effects relating to the pressure-welding structure.

Alternatively, a manufacturing method described below can be employed to produce the terminal-attached electric wire 1 in the present embodiment while using the above pressure-welding structure. In the manufacturing method for the terminal-attached electric wire 1 in this modified embodiment, all of the element wires 11a in the core-wire exposed portion 11X that have been preliminarily aligned are press-fitted between the pair of pressure-welding pieces 43, 43. This manufacturing method for the terminal-attached electric wire 1 includes: the same core-wire exposed portion forming step as in the above example; an element wire preliminarily aligning step in which all of the element wires 11a in the core-wire exposed portion 11X are aligned; and an electric wire attaching step in which the core-wire exposed portion 11X in the electric wire 10 is attached to the terminal fitting 20.

In the core-wire exposed portion forming step in this modified embodiment, a jig (not illustrated) or the like is used to align all of the element wires 11a in the core-wire exposed portion. 11X in the same sequence as in the aligned. state in the core wire pressure-welding section 43A, for example (FIG. 5).

The electric wire attaching step in the modified embodiment includes: a core wire aligning step (the view on the left side of FIG. 6) in which the core-wire exposed portion 11X that has all of the element wires 11a therein aligned in the element wire preliminarily aligning step is inserted between the aligning end surfaces 43b, 43b and are moved between the aligning end surfaces 43b, 43b toward the core wire pressure-welding section 43A with all of the element wires 11a in the core-wire exposed portion 11X thus aligned; and a core wire pressure-welding step (the view on the right side of FIG. 6) in which the core-wire exposed portion 11X that has passed through the element wire aligning section 43B is press-fitted between the pressure welding end surfaces 43a, 43a, whereby, between the pressure-welding end surfaces 43a, 43a, all of element wires 11a in the core-wire exposed portion 11X are each brought into contact with either of the pressure-welding end surfaces 43a, 43a in the aligned state.

The terminal-attached electric wire 1 produced by this manufacturing method includes the above pressure-welding structure and can therefore produce effects of the pressure-welding structure. Furthermore, the manufacturing method in this modified embodiment causes all of the element wires 11a in the core-wire exposed portion 11X to be preliminarily aligned in the same sequence as in the aligned state in the core wire pressure-welding section 43A, whereby loads that are applied to the element wires 11a when the core-wire exposed portion 11X is inserted into The element wire aligning section 43E can be reduced.

In a pressure-welding structure according to the present embodiment, a pair of pressure-welding pieces into which a core-wire exposed portion is press-fitted are provided with a core wire pressure-welding section that brings all element wires in the core-wire exposed portion between pressure-welding end surfaces into contact with either of the pressure-welding end surfaces in an aligned state. Therefore, this pressure-welding structure can reduce electrical resistance as compared with a case where some of the element wires are not brought into contact with the pressure-welding end surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pressure-welding structure comprising:
    a core-wire exposed portion in an electric wire, the core-wire exposed portion being a portion in which a core wire composed of a plurality of element wires is exposed; and
    at least one pair of pressure-welding pieces made of an electroconductive material, the at least one pair of pressure-welding pieces each including a core wire pressure-welding section in which pressure-welding end surfaces are disposed facing each other at a distance, the at least one pair of pressure-welding pieces each having the core-wire exposed portion press-fitted between the pressure-welding end surfaces, wherein
    the core wire pressure-welding section is formed as a section that brings all of the element wires in the core-wire exposed portion, between the pressure-welding end surfaces, into contact with either of the pressure-welding end surfaces while being in an aligned state.

2. The pressure-welding structure according to claim 1, wherein
    each of the at least one pair of pressure-welding pieces includes an element wire aligning section in which aligning end surfaces are disposed at a distance that is larger than the distance at which the pressure-welding end surfaces are disposed, and
    the core wire aligning section is formed as a section that enables all of the element wires in the core-wire exposed portion to, between the aligning end surfaces, be moved toward the core wire pressure-welding section while being kept aligned.

3. The pressure-welding structure according to claim 2, wherein
    the core wire aligning section is formed as a section that enables all of the element wires in the core-wire exposed portion to, between the pressure-welding end surfaces, be moved toward the core wire pressure-welding section while being kept in the same sequence as in the aligned state in the, core wire pressure-welding section.

4. The pressure-welding structure according to claim 2, wherein
    the pressure-welding end surfaces are formed at a distance that is larger than a diameter that each of the element wires in a circular columnar shape has before being press-fitted and that is smaller than twice the diameter, and
    the aligning end surfaces are formed at a distance that is larger than twice the diameter and that is smaller than three times the diameter.

5. The pressure-welding structure according to claim 3, wherein
    the pressure-welding end surfaces are formed at a distance that is larger than a diameter that each of the element wires in a circular columnar shape has before being press-fitted and that is smaller than twice the diameter, and
    the aligning end surfaces are formed at a distance that is larger than twice the diameter and that is smaller than three times the diameter.

6. A terminal-attached electric wire, comprising:
    an electric wire including a core wire that is composed of element wires and a covering that covers the core wire except for a core-wire exposed portion in which the core wire is exposed; and
    a terminal fitting including at least one pair of pressure-welding pieces, the at least one pair of pressure-welding pieces each including a core wire pressure-welding section in which pressure-welding end surfaces are disposed facing each other at a distance, the terminal fitting having the core-wire exposed portion press-fitted between the pressure-welding end surfaces in each of the at least one pair of pressure-welding pieces, wherein
    the core wire pressure-welding section is formed as a section that brings all of the element wires in the core wire exposed portion, between the pressure-welding end surfaces, into contact with either of the pressure-welding end surfaces while being in an aligned state.

7. A terminal-attached electric wire manufacturing method comprising:
    attaching a core-wire exposed portion in an electric wire to a terminal fitting, the core-wire exposed portion being a portion in which a core wire composed of a plurality of element wires is exposed, the terminal fitting including at least one pair of pressure-welding pieces, the at least one pair of pressure-welding pieces each including a core wire pressure-welding section in which pressure-welding end surfaces are disposed facing each other at a distance, the at least one pair of pressure-welding pieces each including a core wire aligning section in which aligning end surfaces are disposed facing each other at a distance that is larger than the distance at which the pressure-welding end surfaces are disposed, wherein
    the attaching a core-wire exposed portion comprises:
    inserting, while aligning all of the element wires in the core-wire exposed portion between the aligning end surfaces, and then, between the aligning end surfaces, moving all of the element wires is the core-wire exposed portion toward the core wire pressure-welding section while being kept in an aligned state entered by the element wires at the insertion, and
    press-fitting, between the pressure-welding end surfaces, the core-wire exposed portion that has passed through the core wire aligning section, and bringing all of the element wires in the core-wire exposed portion, between the pressure-welding end surfaces, into contact with either of the pressure-welding end surfaces while being in an aligned state.

* * * * *